Figure 1:
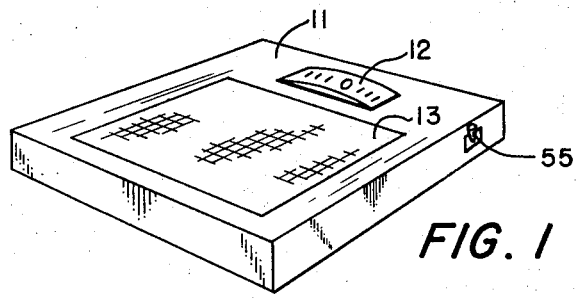

United States Patent
Kaloustian et al.

[15] 3,693,739
[45] Sept. 26, 1972

[54] BATHROOM SCALE

[72] Inventors: Arpiar Kaloustian, 10 Arch St., Providence, R.I. 02907; D. Richard Small, 21 Latnern Lane, Sharon, Mass. 02067

[73] Assignee: Said Arpiar Kaloustian by said Small

[22] Filed: June 2, 1971

[21] Appl. No.: 149,293

[52] U.S. Cl. ................................................. 177/214
[51] Int. Cl. .................................................. G01g 7/00
[58] Field of Search ....... 177/176, 213, 214, 256, 257

[56] References Cited

UNITED STATES PATENTS 1,827,758   10/1931   McKim .................... 177/214

Primary Examiner—Richard B. Wilkinson
Assistant Examiner—George H. Miller, Jr.
Attorney—Richard F. Benway

[57] ABSTRACT

A bathroom scale electrically operated having a folded lever arm and small electric motor for counterweight. The scale need not return to zero after each weighing and dual power supply provide a rugged scale which has no contacts which need careful adjusting.

6 Claims, 5 Drawing Figures

PATENTED SEP 26 1972　　　　　　　　3,693,739

INVENTORS
ARPIAR KALOUSTIAN
D. RICHARD SMALL
BY

*Richard F. Denway*

ATTORNEY 3,693,739

BATHROOM SCALE

Present day bathroom scales are mechanical and operate on a spring balance arrangement. The spring balance is extremely inaccurate and does not provide linear accuracy over its range. Accordingly, the present invention which is a dead weight scale, electrically motivated, has been developed to obviate the lack of accuracy with the above type scale.

In order to achieve such a scale, several novel principles were developed.

To provide uniform accuracy on the platform regardless of where the concentration of force were placed, that is, no matter which corner the person stands on, four pivots at each corner underneath the platform supported with four arms which form a 45° angle with the pivot point was discovered. To make a practical electric counterweight arrangement, the lever arm was broken down into four separate arms, which act as multipliers in the counterweight arrangement. These arms can then be folded to fit within the conventional bathroom scale flat on the floor.

The counterweight in the present invention is a small electric motor which moves along the counterweight arm, as opposed to driving something in prior art scales. The electric motor, therefore, is very small and consumes very little power. The motor is arranged such that its armature engages a rack, thus preventing slippage of the motor with the attendant very closely controlled accuracy. In order to prevent the motor from overshooting, a solenoid brake locks the motor in place so that inertia is eliminated. The solenoidal brake is in series electrically with the motor. Therefore, when the contacts make or brake, the current controls very closely the movement of the motor with very little dependence on inertia of the moving counterweight.

A capacitor is inserted in the circuit which protects the contact points whenever they make or brake to provide a short interval of time which can be controlled by judicious selection to further reduce override on the scale. It eliminates oscillation if the contacts are hit, if only momentarily.

A double pole, double throw switch is eliminated by providing a dual power supply with a common return. A loop for driving the indicator provides a uniform load on the motor counterweight arrangement.

An optional switch is provided which enables one to select whether the scale will return to zero or not. This permits a user to compare his weight from day to day. A switch is built into the foot pad of the scale which is energized when the person steps on the scale. When he steps off, a small varistor in the circuit provides a momentary delay such that the scale will not return to zero unless the logic of the three elements in the motor return is attained.

Therefore an object of the present invention is to provide an electrically operated bathroom scale wherein the counterweight is the motor.

Another object of the present invention is to provide a compact scale with a folded lever arm.

Another object of the present invention is to provide an electrically operated scale with a dual power supply.

Another object of the present invention is to provide a scale which need not return to zero after each weighing.

Another object of the present invention is to provide an electrically operated scale having no override.

Figure 2:
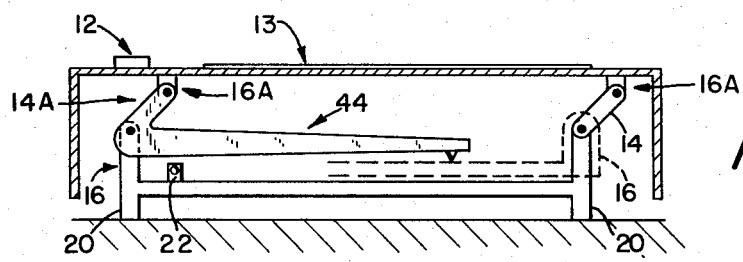
Figure 3:
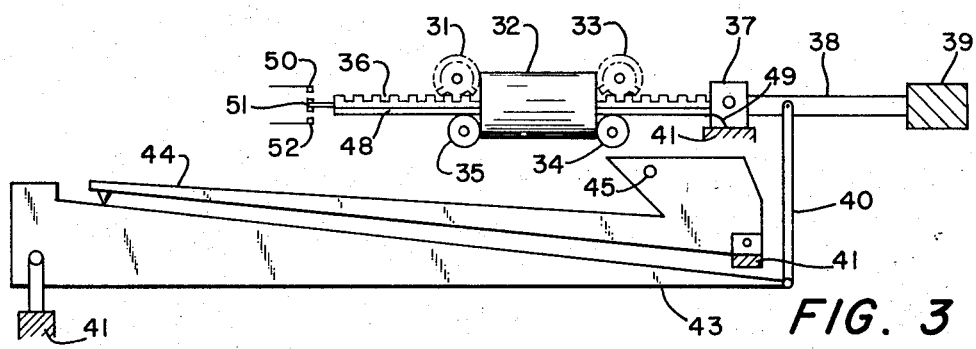
Figure 4:
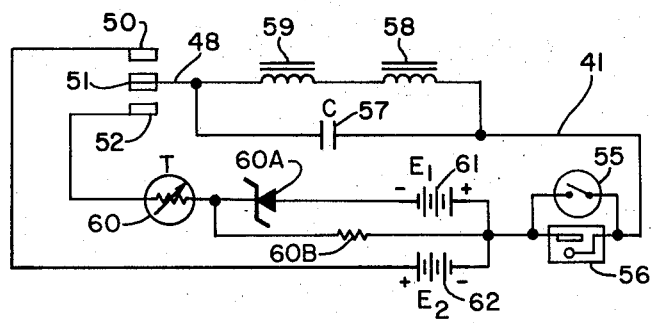
Figure 5:
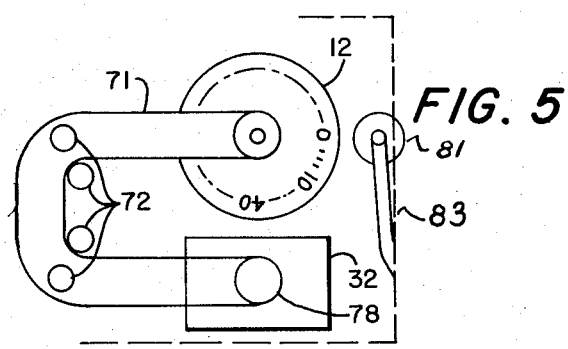

Further objects, features and advantages of the present invention will be better understood from the following detail specification especially when read in conjunction with the attached drawing of which:

FIG. 1 is a view of the scale.
FIG. 2 is cut away section of FIG. 1.
FIG. 3 is an illustration of the folded lever arm.
FIG. 4 is an electrical circuit diagram.
FIG. 5 is a zero adjust arrangement.

Referring to FIG. 1 we see a bathroom scale 11 having an indicator 12 and a place for a person to stand 13. The shape of this scale is the same as any conventional personal bathroom scale and indicator 12 is just like the conventional indicator used in a spring balanced scale. Mat 13 where the person stands to be weighed is somewhat different. It is a rubber mat, separated by foils which act as a switch mechanism. The person being weighed when standing on the mat causes a switch to close just as is done in entryways to supermarkets and the like. Such a switch is conventional in design and will not be discussed further. Switch 55 is utilized in such a way that mat 13 switch can be effectively cut out of the circuit.

Referring to FIG. 2 we see a cut away view of the present invention. Indicator 12 on top of the unit and the mat 13 are shown. The underneath of the platform has two studs 16a. These are pivot points. When the person stands on the scale, linkage 14 and 14a rotate about fixed point 16 on either side of the scale which comes in contact with the ground by legs 20. Therefore, no matter on what corner the individual steps 45° angle of linkage 14 with pivot points 16 permit the platform to provide uniform downward pressure along arm 44 which in turn presses on corresponding arm 43 at a point very near its pivot point. In order to appreciate the functioning of the transfer of platform pressure to the counterweight system, FIG. 3 has been developed.

Referring to FIG. 3 we see three stationary points 41. This stationary points will be connected solidly to the frame having legs 20 as shown in FIG. 2. This portion of the scale does not move. The platform is pressed down and through pivots applies pressure to the counterbalancing system. Therefore 16a shown in FIG. 2 applies its pressure at pivot point 45 in a downward direction. Arm 44 rotates about stationary point 41 as a result of its pivot. The pressure from arm 44 is transferred to arm 43 but in such a manner that arm 43 pivots about stationary point 41 through an appropriate linkage causing 40 to bear down on beam 38 about the pivot point 49 through pedestal 37. Counterbalances 39 and 32 offset this pressure such that a balance can be obtained.

When beam 48 which has stack teeth 36 installed in it is picked up by the action of linkage 40 being pulled down, contact 51 meets with contact 50. Counterbalance 32 is in essence an electric motor which drives gears 31 and 33. This causes the motor 32 to translate along the beam in or out to counteract the pull of linkage 40 on beam 38. Wheels 34 and 35 merely maintain a very snug fit from the motor counterweight 32. If an opposing force is applied to linkage 40 such as beam 38 is pushed upward, the contact 51 will meet with 52 and the motor direction will be reversed.

It will be seen from a strictly mechanical viewpoint from the foregoing that when some one steps onto the scale 11, there weight causes beam 44 to be depressed which acts like a multiplying bar. The effect is reduced and then another multiplying bar again reduces the effect of this force until finally the counterbalance arrangement which is made to offset this force is a very small electric motor.

Referring now to FIG. 4 we see the equivalent circuit.

51 is a switch shown above in FIG. 3 and one contact for causing the motor to go in one direction and 52 is another contact that causes the motor to go in the opposite direction. 60 is a thermister which causes a short delay such that the motor does not move for a prearranged time. 60a is a rectifier or more particularly a zener diode. 61 and 62 are separate power supplies, which are connected in opposite directions which causes the motor to reverse when required. 60b is a resistor. 55 is a bypass switch. 56 a switch which is two foils under mat 13 which is energized when one is standing on the scale. A single lead 41 interconnects both power supplies. This use of two power supplies obviates the requirement for a reversing switch and the burdensome necessity for very careful calibration of its contacts.

59 is the coil of the motor. 58 is the coil in a solenoid brake which is used to lock the motor gears. The motor cannot run unless sufficient current is passing through 58 because it engages the brake and prevents the gears from turning. The purpose of having two coils in series is the elimination of overriding of the motor. As soon as the motor reaches the point where the contact 50, 51 are broken; or 51, 52 are broken declining current causes the solenoid to drop instantly which engages the gears that causes the motor to stop preventing override.

Capacitor 57 is connected across the coils which are in series to protect contacts 51, 50 and 52 from pitting. It also provides a certain amount of delay such that if contacts are made instantaneously, the motor is not energized therefore spurious movements of the scale are eliminated. To best understand the workings of this circuit a detailed description is in order.

When someone steps on scale 11, mat 13 causes switch 56 to close. The beam is depressed such that contact 51 closes. Battery 62 then forces current through lead 48 through the coil of motor 59 and solenoid 58 back to and around through switch 56 to the other side of battery 62. The circuit being made, the motor is energized; so too is the solenoid coil. The solenoid lifts and the brake is disengaged. Enough current passing through the motor causes it to turn its gears, and the motor moves out to such a point on the beam that contact 51 breaks with contact 50. As soon as this happens the circuit is opened. However, capacitor 57 will continue to feed currents through both coils for an instant period of time. Therefore, if the contacts are really opened as a result of vibration or jumping on the scale instantaneously, the motor will continue to run but for a very short time. If, on the other hand, the opening has resulted from the balancing beam, it will remain open for a few micro seconds and then the motor will come to a stop at that point. The arm being imbalanced, the scale can be read indicating the weight being placed on the scale. If a person then steps off, switch 56 opens. However, prior to that chances are that contact 51 will meet with contact 52. However, thermister 60 resistance will be high which will prevent current from passing from battery 61 through the coil and motor in opposite directions which would drive the motor on the beam in an opposite direction. Now with 56 open even though contacts 51 and 52 are closed the motor cannot run so therefore will remain where it had stopped, and that point is the point where the person who had stepped off the scale last had indicated their weight.

Now if switch 55 were closed after the above had occurred, switch 56 would be shorted, current from battery 61 would pass through zener diode 60a and would heat up thermister 60 because 51 and 52 were closed and current were not able to pass through capacitor 57 or coils 59 and 58. After heating up the resistance would drop permitting full voltage to be impressed across coils 52 and 58. The solenoid would disengage the brake and motor 59 would be energized fully to enable the motor on the beam to return to its new weight position from someone standing on the scale in the present instance. When it reaches zero, contacts 51 and 52 will open and the motor will come to a stop provided the contacts remain open long enough.

Capacitor 57 provides an instant of delay in that it has to charge up whenever the contacts close and the scale is going upward to measure or counteract the weight of the individual standing on the scale. On the other hand, upon return when the motor is switched to have a reverse current imposed on it, a different delay mechanism is required, and that is accomplished by means of a zener diode 68, resistor 60b and thermister 60. This provides a second time delay enabling switch 56 to control. Whether the motor is engaged or not engaged the unit does not return to the lower scale point because the motor is off for sufficient current is not permitted to pass through the coils to pick up the solenoid.

The delay is best explained by assuming that a person 200 lbs. stepped on the scale. Instantly the contacts were closed, voltage would appear across the capacitor and coil arrangement such that it would have to charge up. After it had charged up to a certain point determined by a judicious selection of its size in combination with the coils and other resistance elements in the circuit, enough current would pass through coil 58, which would life the solenoid and disengage the gears. At the same time, current would be passing through the motor causing it to turn the gears. When the motor arrives at this point where the weight of the motor counteracted the weight of the person on the scale through the multipliers and linkage, the contacts would open and the motor would come to a halt. The position of the motor would indicate 200 on the scale. As soon as they stopped off through the delay mechanisms of the thermister and other circuit elements, the motor could not operate and switch 56 would be open. Therefore, the motor would not be energized and the scale would continually indicate 200 even though no one were on the scale.

Another person who wishes to use the scale may weight only 150 lbs. They would step on the scale, it would close switch 56. However, points 51 and 52 would be reclosed due to the position of the motor on the beam. After a short while, sufficient current would pass through the thermister such that full voltage would appear across the capacitor and coil combination. The capacitor would then charge up and sufficient current would pass through coil 58 to cause the solenoid to pick up again, disengage its brake and cause the motor to move in the opposite direction from above. When the motor got to the point where the counterbalance indicated 150 lbs., the contacts would open and the motor would stop. When that person stepped off the scale, the contacts 51 and 52 would close. However, switch 56 would open the motor could not move in this new direction.

Bypass switch 55 is shown in FIG. 1. If the user wishes to have the scale calibrated to return to zero for any reason, he could bypass switch arrangement 56 with switch 55.

Referring now to FIG. 5 we see indicator 12 having a scale. We note motor 32 with a wheel 78. A continuous belt 71 is fed around, through and around rollers 72 to indicator 12. The purpose of the continuous belt is to provide a constant pull on motor 32 so that the scale is linear throughout its operation.

Wheel 81 is attached to a spring loaded arm 83. When someone wishes to calibrate or adjust indicator 12, they depress wheel 81 until it comes in contact with the indicator and then it is turned causing the indicator to move its indication so that it can be properly zeroed. When it is zeroed, the pressure is taken off 81 and the spring loaded arm causes it to remove itself away from the indicator.

Our invention has been described with reference to many novel features. The pivot operation of the platform enables uniform pressure to be applied to the multiplier arms and to a motorized counterweight system; the counterweight being an electric motor. The folded arms provided compactness without departing from accuracy. A dual power supply and attendant delay mechanisms provide a unique combination of switching arrangements which prevent oscillation and overrides. They further provide a savings in time and a recording of earlier weight by the simple expedient of a pressure pad switch under the individual standing on the scale. Calibration is provided by disabling the special pressure switch spoken of above and a simple wheel adjustment. A continuous belt on the indicator provides uniform drag on the motor which improves accuracy.

Although we have described our invention with reference to specific apparatus, those skilled in the art may make many substitutions and variations without departing from its true scope and spirit. Accordingly, we wish only to be limited in our invention by the appended claims.

We claim:

1. A bathroom scale comprising,
   a frame having legs for placement on a floor,
   a platform for receiving people to be weighed,
      said platform being pivotally connected to said frame and forming an angle between the frame and the platform whereby a weight wherever placed on said platform causes a uniform vertical force on the entire platform,
   a counterweight,
   a folded lever arm interposed between said platform and said counterweight
      said counterweight being an electric motor free to travel along the section of said folded lever arm,
   a source of electric power for supplying said electric motor,
   switching means responsive to the movement of said platform whereby the motor is turned off or on to counterbalance said platform,
   means for indicating the position of said motor calibrated to read weight placed on said scale.

2. A bathroom scale according to claim 1 which further includes solenoidal breaking means electrically in series with said motor to reduce overriding.

3. A bathroom scale according to claim 2 which further includes electrical relay means for eliminating oscillation in said motor.

4. A bathroom scale according to claim 3 wherein said electric power includes a dual power source whereby a reversing switch is unnecessary.

5. A bathroom scale according to claim 4 which further includes switching means responsive to any weight on said scale whereby the scale remains at the last weight placed on the scale.

6. A bathroom scale according to claim 5 wherein said indicating means includes a continuous belt to provide uniform drag on said motor.

* * * * *